United States Patent
Bhaskaran et al.

(10) Patent No.: US 7,212,571 B2
(45) Date of Patent: May 1, 2007

(54) METHOD AND APPARATUS FOR DCT DOMAIN FILTERING FOR BLOCK BASED ENCODING

(75) Inventors: Vasudev Bhaskaran, Sunnyvale, CA (US); Changick Kim, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 637 days.

(21) Appl. No.: 10/355,469

(22) Filed: Jan. 31, 2003

(65) Prior Publication Data

US 2004/0151243 A1    Aug. 5, 2004

(51) Int. Cl.
*H04N 7/18* (2006.01)
(52) U.S. Cl. .............................. 375/240.03; 375/240.05
(58) Field of Classification Search ................................ 375/240.01–240.29
See application file for complete search history.

(56) References Cited

U.S. PATENT DOCUMENTS

| | | | |
|---|---|---|---|
| 5,260,782 A | 11/1993 | Hui | |
| 5,552,829 A | 9/1996 | Kim et al. | |
| 5,819,035 A * | 10/1998 | Devaney et al. | 709/202 |
| 5,847,766 A | 12/1998 | Peak | |
| 5,881,180 A | 3/1999 | Chang et al. | |
| 5,933,194 A | 8/1999 | Kim et al. | |
| 5,986,710 A | 11/1999 | Kim et al. | |
| 6,148,027 A | 11/2000 | Song et al. | |
| 6,175,592 B1 | 1/2001 | Kim et al. | |
| 6,504,873 B1 * | 1/2003 | Vehvilainen | 375/240.29 |
| 6,944,224 B2 * | 9/2005 | Zhao et al. | 375/240.16 |
| 6,950,473 B2 * | 9/2005 | Kim et al. | 375/240.29 |
| 2001/0008544 A1 | 7/2001 | Ishiyama | |
| 2002/0054639 A1 | 5/2002 | Kawashima et al. | |
| 2002/0064228 A1 | 5/2002 | Sethuraman et al. | |

OTHER PUBLICATIONS

Yung-Kai Lai, Jin Li and C.-C. Jay Kuo, "Removal of Blocking Artifacts of DCT Transform by Classified Space-Frequency Filtering", Proceedings of ASIMOLAR-29, 1995, pp. 1457-1461.

* cited by examiner

*Primary Examiner*—Ahand Rao (57) ABSTRACT

A method for encoding video data to reduce blocking artifacts is provided. The method initiates with identifying a macro-block as being associated with a blocking artifact. For example the macro-block may be identified as a low activity macro-block or a high activity macro-block. Then, blocking artifacts introduced through a compression operation are mitigated by adjusting both a quantization parameter and an amount of bits generated from the quantization parameter. A video encoder and a system for processing image data associated with block based compression are provided.

17 Claims, 10 Drawing Sheets

METHOD AND APPARATUS FOR DCT DOMAIN FILTERING FOR BLOCK BASED ENCODING

BACKGROUND OF THE INVENTION

1. Field of the Invention

This invention relates generally to encoding systems and more particularly to a method and system for pre-processing techniques for deblocking applied in an encoding loop to improve image quality and simplify decoding.

2. Description of the Related Art

Transmission of video data has become more popular as network bandwidth has increased to handle the bandwidth required for video data having an acceptable quality level. Video data requires a high bandwidth, i.e., many bytes of information per second. Therefore, video compression or video coding technology reduces the bandwidth requirements prior to transmission of the video data. However, the compression of the video data may negatively impact the image quality when the compressed video data is decompressed for presentation. For example, block based video compression schemes, such as Motion Picture Expert Group (MPEG) coding standard, suffer from blocking artifacts which become visible at the boundaries between blocks of a frame of the video image.

Figure 1:
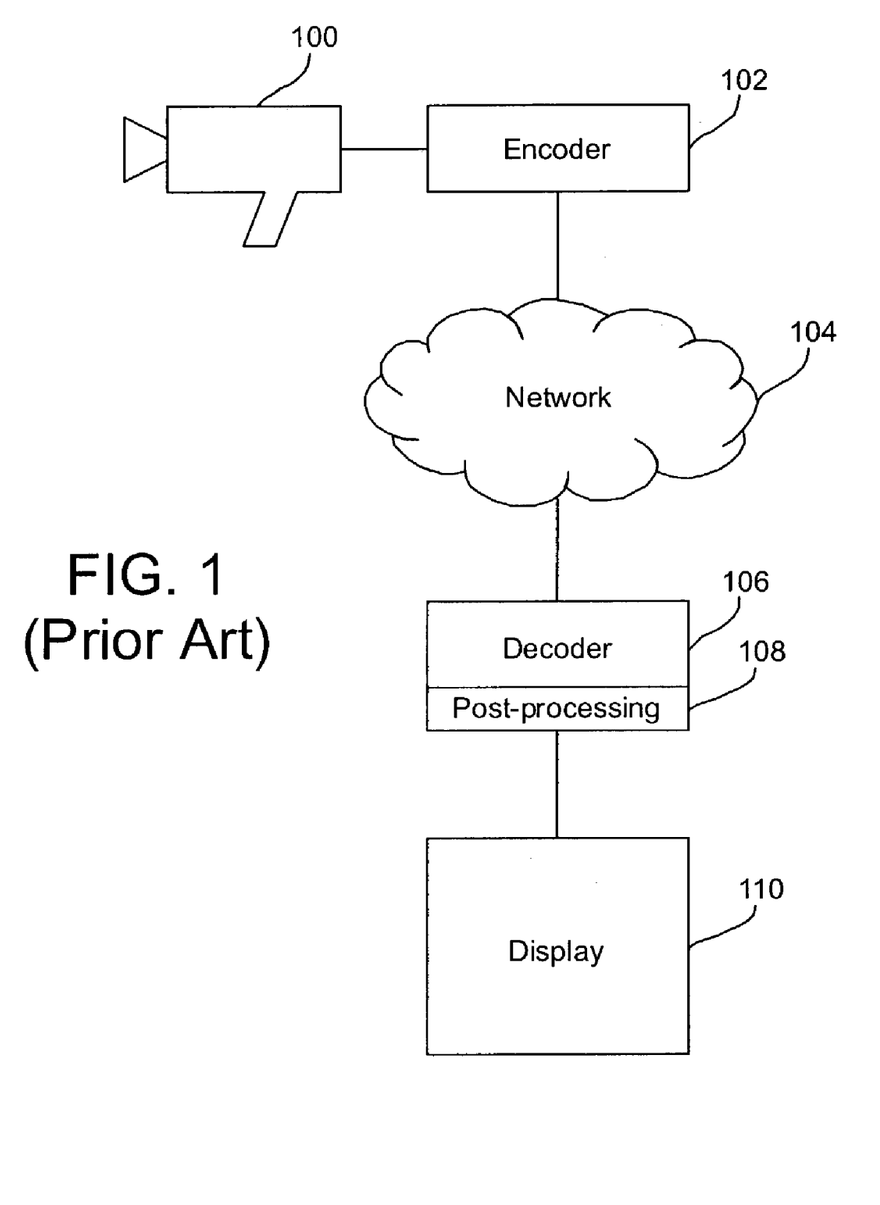
FIG. 1 is a simplified schematic diagram of a video coding system.

FIG. 1 is a simplified schematic diagram of a video coding system. Video capture device 100 captures image data. The image data is then compressed according to a compression standard through encoder 102. The compressed image data is then transmitted over network 104 to decoder 106. Decoder 106 may include post-processing block 108, which is configured to compensate for blocky artifacts. The decompressed image data that has been post processed is then presented on display monitor 110.

Thus, post-processing block 108 includes the capability to offset blocky artifacts, e.g., low pass filters applied to the spatial domain attempt to compensate for the artifacts introduced through the compression standard. However, one shortcoming with current post-processing steps is their computational complexity, which requires about 30–50% of the total computational power needed in the decoder, not to mention the dedication of compute cycles for post-processing functions. It should be appreciated that this type of power drain is unacceptably high for mobile terminals, i.e., battery enabled consumer electronics, such as terminals incorporating thin film transistors (TFT) technology, super-twisted nematic (STN), and mobile digital-thin film diode (MD-TFD). Another shortcoming of the low pass filters currently being used is that the amount of time for the filtering operation may cause a noticeable delay in the presentation of the image. This delay is especially noticeable with respect to portable electronic computing systems due to the limited resources of the embedded systems controlling these devices.

As a result, there is a need to solve the problems of the prior art to provide a method and system for simplifying or eliminating the need for post-processing operations for minimizing blocking artifacts.

SUMMARY OF THE INVENTION

Broadly speaking, the present invention fills these needs by providing a discrete cosine transform filter that may be applied in the encoding loop to allow for the elimination or simplification of post-processing operations in the decoder. It should be appreciated that the present invention can be implemented in numerous ways, including as a process, a system, or a device. Several inventive embodiments of the present invention are described below.

In one embodiment, a method for substantially reducing blocking artifacts of video image data is provided. The method initiates with characterizing a macro-block of the video image data as either a high activity macro-block or a low activity macro-block. If the macro-block is a high activity macro-block, then the method includes the following steps. A transform (e.g., a discrete cosine transform (DCT)) block associated with the macro-block is quantized with a first quantization parameter to identify the locations of non-zero coefficients. Next, the transform block of the macro-block is quantized with a second quantization parameter. The second quantization parameter has a lower value than the first quantization parameter and the second quantization parameter is applied to locations of the macro-block corresponding to locations of the non-zero coefficients obtained by the first quantization parameter. If the macro-block is a low activity macro-block, then the method includes quantizing the macro-block with the second parameter. The low activity compressed block is constrained to have a maximum of three non-zero coefficients to maintain a minimum amount of bits in one embodiment.

In another embodiment, a method for encoding video data to reduce blocking artifacts is provided. The method initiates with identifying a macro-block as being associated with a blocking artifact. For example the macro-block may be identified as a low activity macro-block or a high activity macro-block. Then, blocking artifacts introduced through a compression operation are mitigated by adjusting both a quantization parameter and an amount of bits generated from the quantization.

In yet another embodiment, a method for processing a frame of image data during encoding to reduce power consumption during decoding is provided. The method initiates with classifying a macro-block as a high activity macro-block. Then, a), a block associated with the frame of image data is subdivided into a first plurality of sub-blocks according to a first parameter. Next, b), a portion of the first plurality of sub-blocks are identified. Then, c), the block associated with the frame of image data is subdivided into a second plurality of sub-blocks according to a second parameter. The value of the second parameter is less than the value of the first parameter. Operations a), b) and c) are repeated for each block associated with the frame of image data. Then, the image data is enabled for presentation.

In still yet another embodiment, a computer readable media having program instructions for encoding video data for reducing blocking artifacts is provided. The computer readable media includes program instructions for identifying a macro-block as being associated with a blocking artifact. Program instructions for mitigating the blocking artifact introduced through a compression operation by adjusting both a quantization parameter and an amount of bits generated from the quantization parameter are included.

In another embodiment, a video encoder configured to provide image data needing minimal post-processing during decoding is provided. The video encoder includes circuitry for characterizing a macro-block of image data to be encoded as one of a high activity block and a low activity block. Circuitry for adjusting a quantizer scale based upon characterization of the macro-block is also included.

In yet another embodiment, a system for processing image data associated with block based compression is provided. The system includes an encoder configured to identify a type of block of image data for processing. The encoder is configured to minimize a blocking artifact by adjusting both a quantization parameter and an amount of bits generated from the quantization parameter when encoding the block of image data. The system includes a decoder configured to receive the encoded block of image data transmitted from the encoder. The decoder is configured to decode the encoded block of image data for presentation.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 10A and 10B illustrate the images comparing the blocky artifacts generated when FIG. 9B is adjusted to provide substantially the same bit rate as FIG. 9A.

DETAILED DESCRIPTION OF THE PREFERRED EMBODIMENTS

An invention is described for reducing the blocky artifacts for block-based video compression schemes through the application of a filter in the encoding loop. It will be apparent, however, to one skilled in the art, in light of the present disclosure, that the present invention may be practiced without some or all of these specific details. In other instances, well known process operations have not been described in detail in order not to unnecessarily obscure the present invention. FIG. 1 is described in the "Background of the Invention" section. The term about as used to herein refers to +/−10% of the referenced value.

The embodiments of the present invention provide a method and apparatus for minimizing blocky artifacts introduced through the encoding loop in order to minimize any post processing operations during decoding. In one embodiment, a filter applied in the compressed domain of a block based compression scheme at the encoder enables minimizing or eliminating post processing operations at the decoder. By applying the filter in the compressed domain in the encoder side, the post processing occurring at the decoder is substantially reduced or even eliminated through the control of blocky artifacts at the encoding phase.

In another embodiment, the blocks likely to be associated with blocky artifacts are identified during the encoding process. For example, with reference to a block based compression scheme, such as Motion Picture Expert Group (MPEG) 4, a macro-block of a frame of image data is classified as a high activity or low activity macro-block based upon the variance calculated in the spatial domain. It will be apparent to one skilled in the art that each macro-block is associated with six 8×8 blocks (four luminance blocks and two chrominance blocks) of data. A high activity block may be associated with significant changes in pixel values, e.g., edges. In contrast, a low activity block may be associated with a smooth surface in which the pixel values are substantially similar, e.g., a uniform portion of a floor, wall, background, etc. It should be appreciated that people generally notice blocky artifacts in smooth surfaces more readily than surfaces having significant changes in pixel values, i.e., high activity areas. Thus, by diminishing visually salient blocky artifacts in the smooth surfaces the overall image quality is enhanced. Additionally, by limiting the amount of bits generated by high activity areas through a filtering operation, the image quality for the high activity areas remains acceptable. Here, a limit on the number of discrete cosine transform (DCT) coefficients is established through a first quantization parameter (QP). More specifically, the first QP establishes a ceiling on the number of non-zero DCT coefficients associated with the high activity area. In one embodiment, a second quantization parameter, smaller in value than the first QP, is then used by the encoder to define the DCT coefficients to be encoded. Since a smaller QP will result in a larger amount of non-zero DCT coefficients, the ceiling established through the first QP will limit the number of non-zero DCT coefficients generated through the requantization with the second QP.

Therefore, the embodiments described herein allow for a decoder receiving the encoded data to eliminate post processing operations for blocky artifacts. In one embodiment, the decoder includes a simplified post-processing operation where image data for high activity areas are processed to compensate for blocky artifacts. It should be appreciated that the post processing of the high activity blocks in the decoder still represents a significant saving in terms of overhead, as compared with post processing operations being applied to all of the blocks. Thus, the power consumption for handheld portable electronics having a decoder configured to receive image data that has been compressed through a block-based compression standard is likewise reduced. In turn, the life of the battery for the device is extended.

Figure 2:
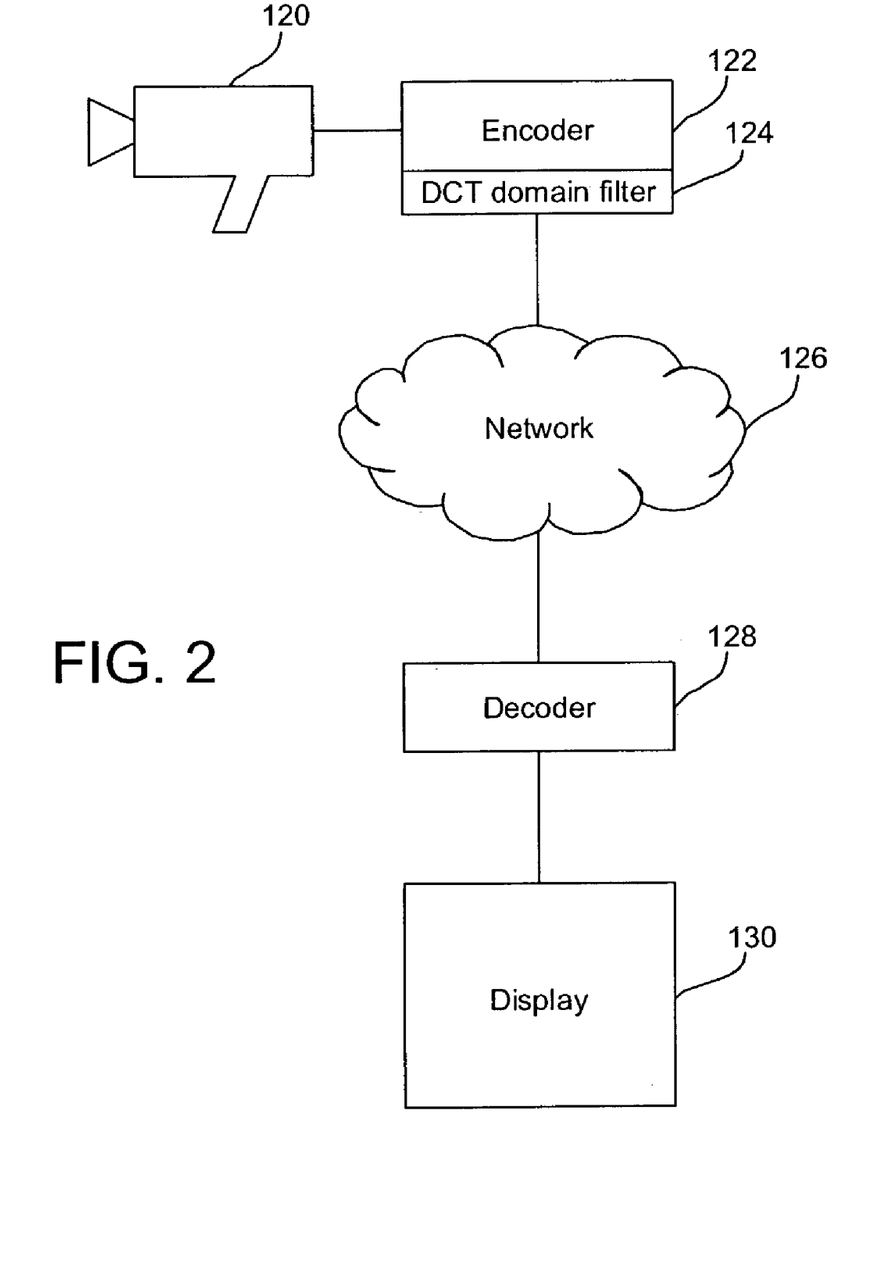
FIG. 2 is a high-level schematic diagram of a system configured to apply a DCT domain filter in an encoding loop in accordance with one embodiment of the invention.

FIG. 2 is a high-level schematic diagram of a system configured to apply a DCT domain filter in an encoding loop in accordance with one embodiment of the invention. Image capture device 120, e.g., a camera, a camcorder, or any other device configured to capture digital image data, is associated with encoder 122. Encoder 122 includes DCT domain filter block 124. DCT domain filter block 124 is configured to reduce blocky artifacts introduced during compression operations as explained in more detail below. Encoder 122 is further configured to transmit the encoded image data over network 126 to decoder 128. In one embodiment, encoder 122 is contained within image capture device 120. Decoder 128 is in communication with display screen 130, which is configured to display the decoded image data which was captured through capture device 120, i.e., reconstruct the image from the compressed data received by the decoder. As will be explained in more detail below, encoder 122 is configured to classify the incoming block of data in the spatial domain so that a DCT domain filter 124 is applied based upon the classification of the incoming block. DCT domain filter 124 is configured to eliminate the need or substantially simplify any post-processing associated with decoder 128. It should be appreciated that decoder 128 may do some post-processing operations as discussed below, however, these operations are significantly reduced or simplified, thereby conserving power for a hand-held electronic device incorporating the decoder. In one embodiment, DCT domain filter 124 mitigates blocking artifacts introduced during compression by adjusting both a quantization parameter (QP) while limiting an amount of bits generated from the quantization parameter. It will be apparent to one skilled in the art that decoder 128 and display screen 130 may be incorporated into a handheld electronic device, e.g., a cell phone, a personal digital assistant, a web tablet, or any portable electronic device configured to receive image data that is compressed according to a block-based standard.

Figure 3:
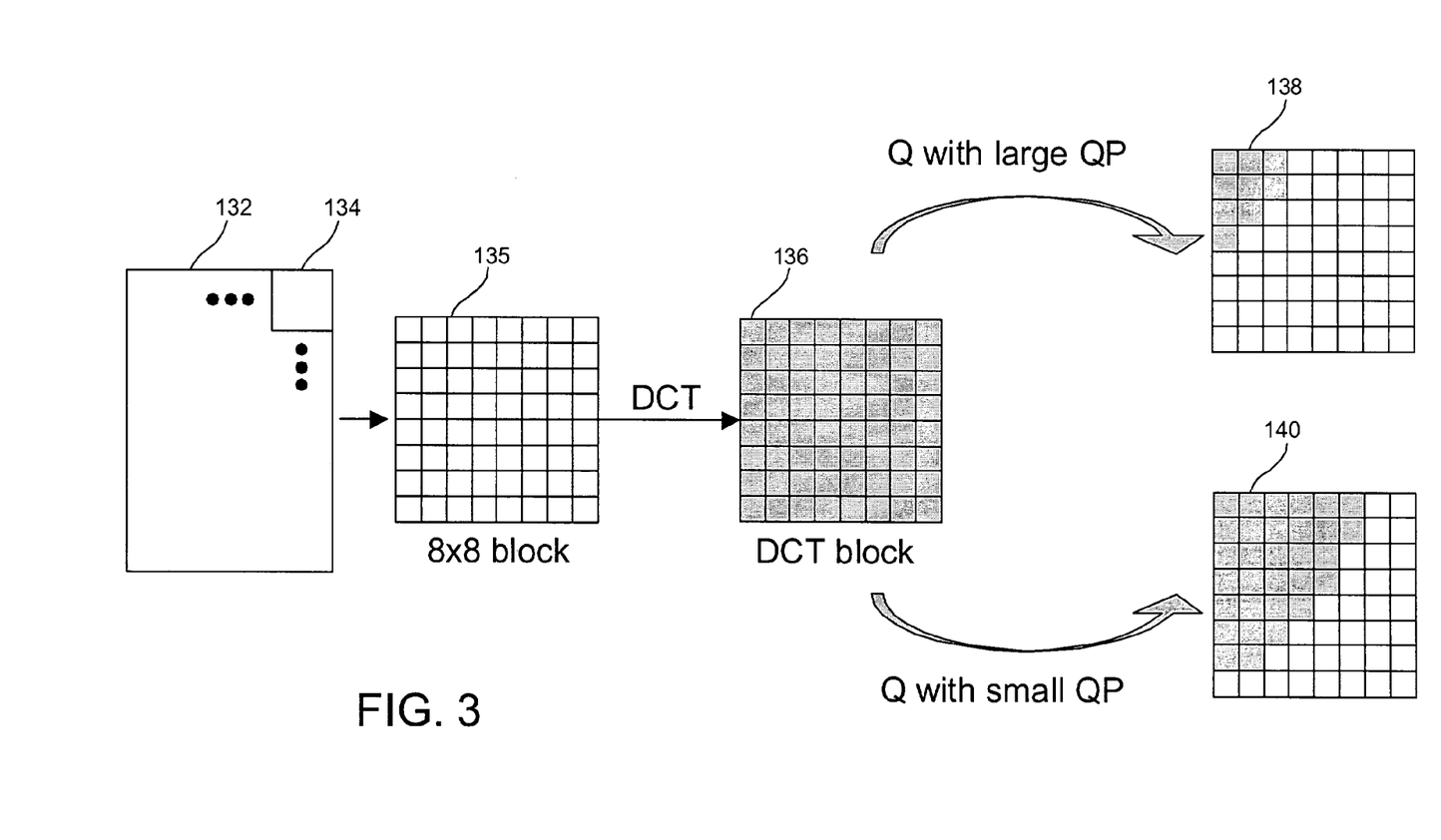
FIG. 3 is a simplified schematic diagram illustrating the differing results when applying a large quantization parameter and a small quantization parameter to a DCT block in accordance with one embodiment of the invention.

FIG. 3 is a simplified schematic diagram illustrating the differing results when applying a large quantization parameter and a small quantization parameter to a DCT block in accordance with one embodiment of the invention. Here, frame 132 of image data includes a plurality of macro-blocks, such as macro-block 134. It will be apparent to one skilled in the art that macro-block 134 includes six 8×8 blocks of image data, where four of the blocks are associated with luminance data and two of the blocks are associated with chrominance data. A single 8×8 block 135, which is associated with macro-block 134, is then compressed through the Discrete Cosine Transform (DCT) function to provide DCT block 136. As is generally known, a quantization process applied to DCT block 136 further reduces the number of DCT coefficients (also referred to as frequency coefficients) by setting some non-zero coefficients to zero. Here, each of the DCT coefficients of DCT block 136 are divided by an integer scale factor, with the result being truncated, in order to throw away information. Thus, where a large quantization parameter (QP) is used as the integer scale factor, a small number of non-zero DCT coefficients remains, as illustrated in block 138. Alternatively, if a small QP is used as the integer scale factor a larger number of non-zero coefficients remain, as illustrated in block 140. In other words, a large QP results in a small amount of bits generated, while a small QP results in a larger amount of bits generated.

Figure 4:
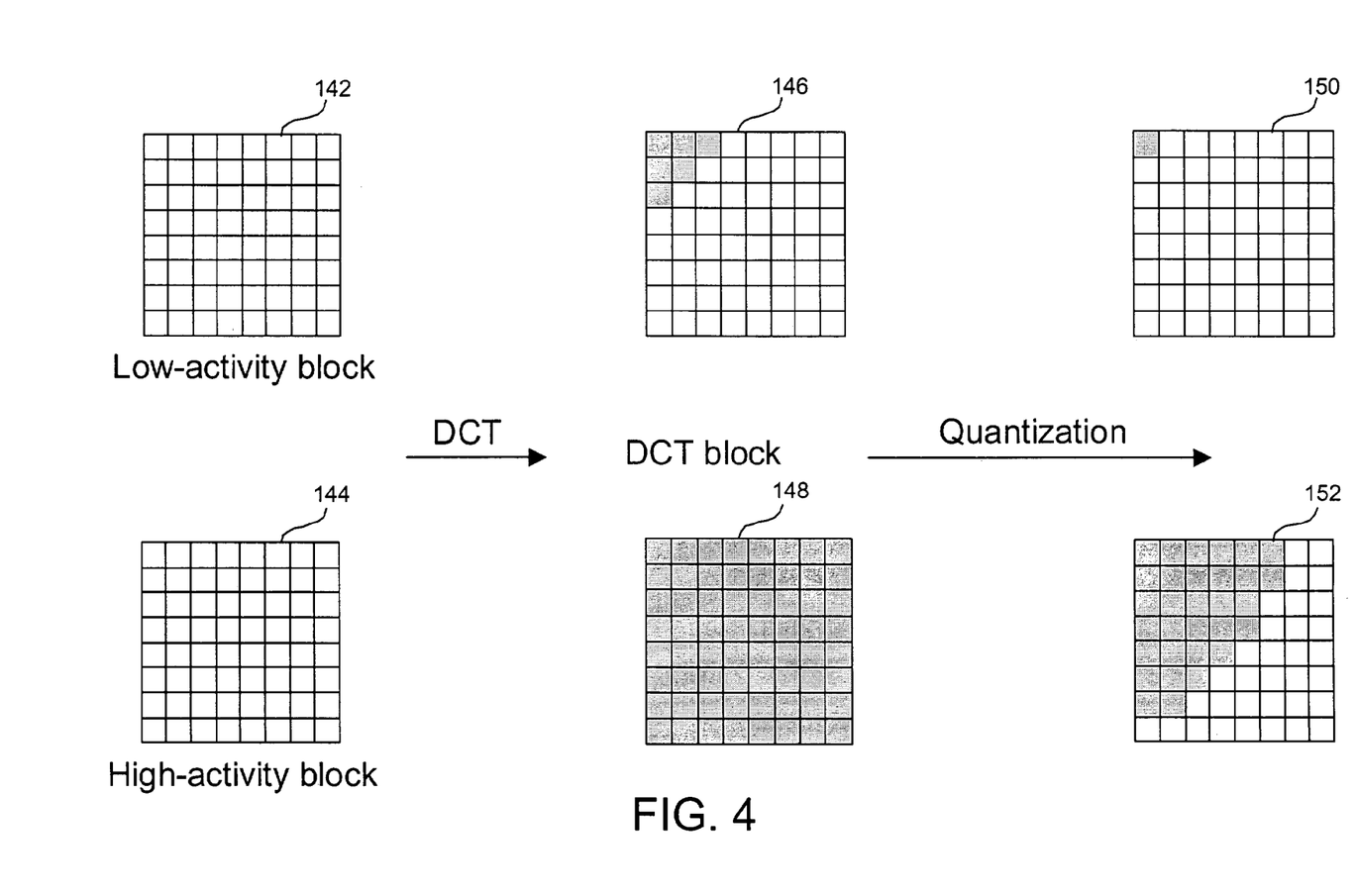
FIG. 4 is a simplified schematic diagram illustrating the quantization results according to a level of block activity in accordance with one embodiment of the invention.

FIG. 4 is a simplified schematic diagram illustrating the quantization results according to a level of block activity in accordance with one embodiment of the invention. Here, low activity block 142 represents a smooth surface, e.g., a wall, a floor, or any uniform area. It should be appreciated that low activity block 142 will be associated with a low variance value as the values of the pixels in block 142 will not vary significantly. In one embodiment, the mean variance value is calculated through the following equation:

$$\sigma^2 = \sum_{i=0}^{N-1} (x_i - \mu)^2$$

Here, N represents the number of pixels in the macro-block, $x_i$ is a pixel value of the i-th element of the macro-block, and $\mu$ is the mean value of all the pixels in the macro-block. Accordingly, if the variance value is greater than a predefined threshold, the macro-block is considered a high activity macro-block. Otherwise, the macro-block is considered a low activity macro-block.

Still referring to FIG. 4, a small amount of non-zero coefficients results from the DCT transform operation performed on block 142, as illustrated by the shaded blocks of DCT block 146. Consequently, the quantization process applied to DCT block 146 may eliminate all the non-zero AC coefficients except for the DC coefficient in the upper left hand corner of the quantized block 150. In contrast, high activity block 144, which is associated with a high variance due to the large differences of pixel values within the block, yields a larger number of non-zero DCT coefficients as illustrated in DCT block 148. Thus, the quantization process for DCT block 148, using the same QP as applied to block 146, will yield a larger number of non-zero coefficients after quantization as illustrated by block 152, relative to block 150. It should be appreciated that low activity block 142 is representative of a smooth area while high activity block 144 is representative of a non-uniform area. As will be explained in more detail below, a QP having a relatively small value is applied to low activity blocks, such as block 142, to yield at least two AC coefficients in addition to the DC coefficient, in order to reduce blocky artifacts. However, if the block is a high activity block, such as block 144, the high activity block is quantized with a large QP initially, in order to set a limit on pixel positions where non-zero AC coefficients may be generated by the QP. That is, a ceiling or maximum is placed on the amount of non-zero coefficients in the quantized block. In one embodiment, the high activity block, more specifically the DCT block associated with the high activity block, is then re-quantized using a smaller QP. Through the limit established by the initial quantization with the large QP, the number of AC coefficients generated by the small QP is restricted to the positions defined by the large QP, in this embodiment. However, the re-quantized value in the decoder side will be closer to the DCT coefficients before quantization in the encoder.

Figure 5:
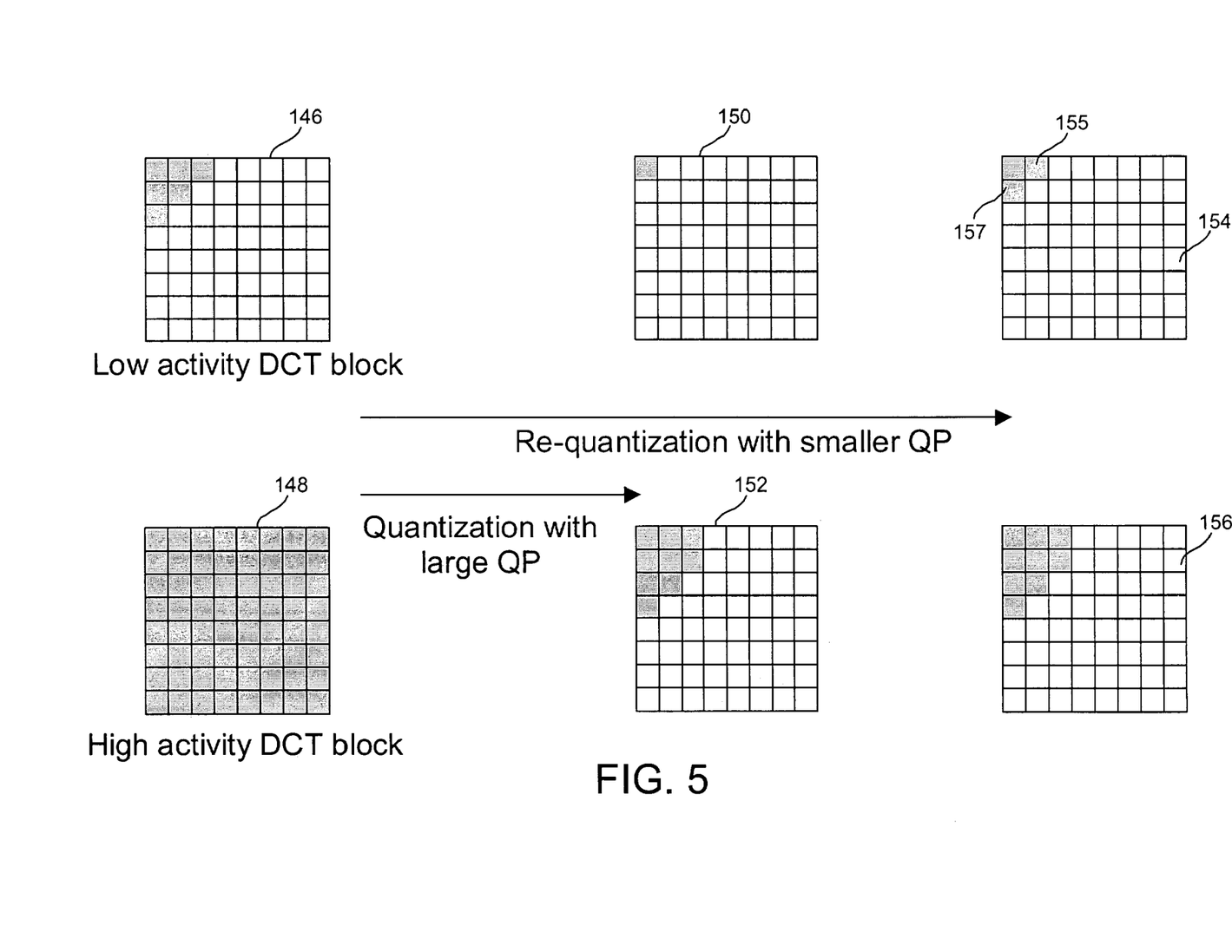
FIG. 5 is a simplified schematic diagram illustrating the re-quantization process with a smaller quantization parameter for blocks associated with either low activity macro-blocks or high activity macro-blocks in accordance with one embodiment of the invention.

FIG. 5 is a simplified schematic diagram illustrating the re-quantization process with a smaller quantization parameter for blocks associated with either low activity macro-blocks or high activity macro-blocks in accordance with one embodiment of the invention. Low activity DCT block 146 is quantized with a smaller quantization parameter (QP) to yield AC coefficients as illustrated in block 154, where the number of non-zero AC coefficients are limited to two coefficients, with the positions of the two coefficients being at the lowest frequency. In one embodiment, even if a first QP yields only a single coefficient, i.e., the DC coefficient, as illustrated in block 150, the re-performance of the quantization with the lower value QP may result in several non-zero coefficients being generated, e.g., the DC coefficient and two AC coefficients as illustrated in block 154. It should be appreciated that the lowest two AC coefficients enable a gradual transition, i.e., smooth blocky artifacts. More specifically, the AC coefficient associated with sub-block 155 provides for a gradual horizontal transition, while the AC coefficient associated with sub-block 157 provides for a gradual vertical transition. It will be apparent to one skilled in the art that the DC coefficient may be described as a measure of the average value of the 64 image samples and is associated with zero frequency in both dimensions, while the remaining 63 coefficients associated with the 8×8 block are referred to as AC coefficients.

Thus, the smooth areas represented by low activity DCT blocks are now provided with gradual horizontal and vertical transitions to surrounding blocks in the smooth area, thereby reducing the blocky artifacts introduced by quantized block 150 where only a DC coefficient is provided. Moving to high activity DCT block 148, quantization of the high activity DCT block is performed with a large QP initially. Quantized block 152 is used to define pixel positions corresponding to non-zero AC coefficients associated with the large QP. That is, the shaded area of quantized block 152 represents the positions of the non-zero AC coefficients. As mentioned above, the large or first QP will generate a compressed block having less coefficients as compared to a quantization performed with a smaller QP. In turn, the lower number of coefficients correspond to a lower bit size. High activity DCT block 148 is then re-quantized with the smaller QP to yield re-quantized block 156, where the AC coefficients are restricted to the portion of the re-quantized block corresponding to the portion of quantized block 152, which was defined by the large QP. Thus, better quality image data is achieved through the use of a smaller QP, however, the amount of bits generated is limited.

Figure 6A:
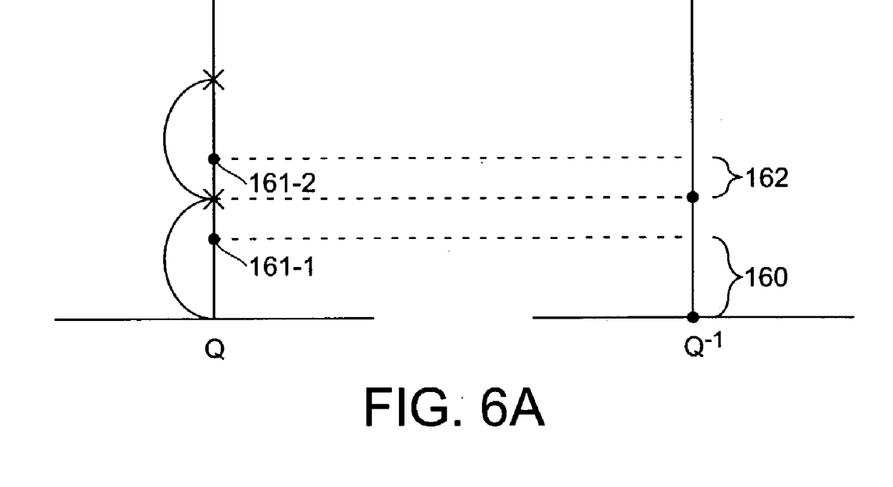
FIG. 6A is a simplified schematic diagram graphically illustrating the errors generated by a large quantization parameter.

FIG. 6A is a simplified schematic diagram graphically illustrating the errors generated by a large quantization parameter. Here, actual pixel values are illustrated by points 161-1 and 161-2. The relative size of the quantization parameter is illustrated by the leaps along the Y axis. Thus, since pixel value 161-1 is missed by the large QP, i.e., the large QP jumps over value 161-1 during quantization (Q), the inverse quantization ($Q^{-1}$) will calculate the value of point 161-1 as zero. Accordingly, the error is represented by distance 160. Likewise, value 161-2 is associated with the error represented by distance 162.

Figure 6B:
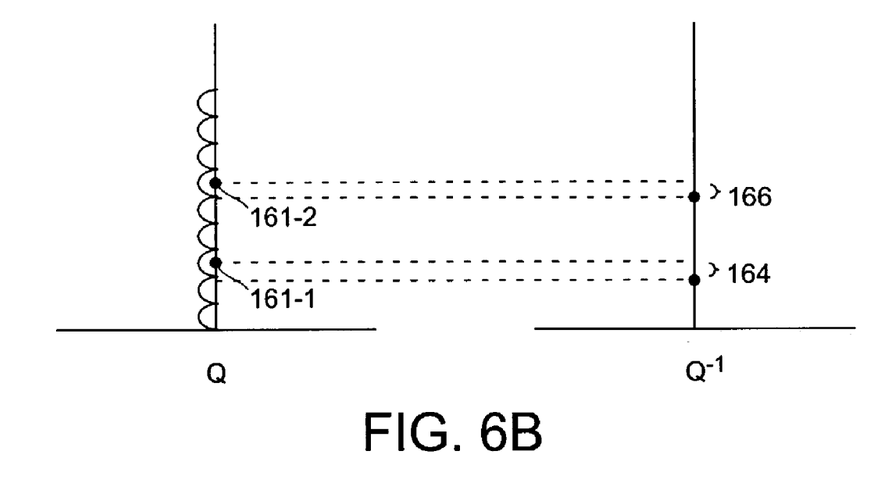
FIG. 6B is a simplified schematic diagram graphically illustrating the reduction in error as the quantization parameter is reduced in accordance with one embodiment of the invention.

FIG. 6B is a simplified schematic diagram graphically illustrating the reduction in error as the quantization parameter is reduced in accordance with one embodiment of the invention. Here, the reduction in quantization step-size is represented by the relatively smaller leaps along the Y axis. In turn, the errors associated with values 161-1 and 161-2 are also smaller. Here, distance 164 represents the error associated with value 161-1 while distance 166 represents the error associated with value 161-2. As can be seen, errors associated with distances 164 and 166 are significantly smaller when compared with errors 160 and 162 with reference to FIG. 6A. However, it should be appreciated that the smaller QP used in FIG. 6B also generates more non-zero AC coefficients and thus a larger amount of data. In essence, a balancing operation must be maintained to provide the required accuracy while at the same time limiting the amount of data, in order to be able to efficiently process the data with the limited resources of the hand-held electronic devices. Of course, the embodiments described herein use less power because of the elimination of post processing operations at the decoder for reducing blocky artifacts.

Figure 7:
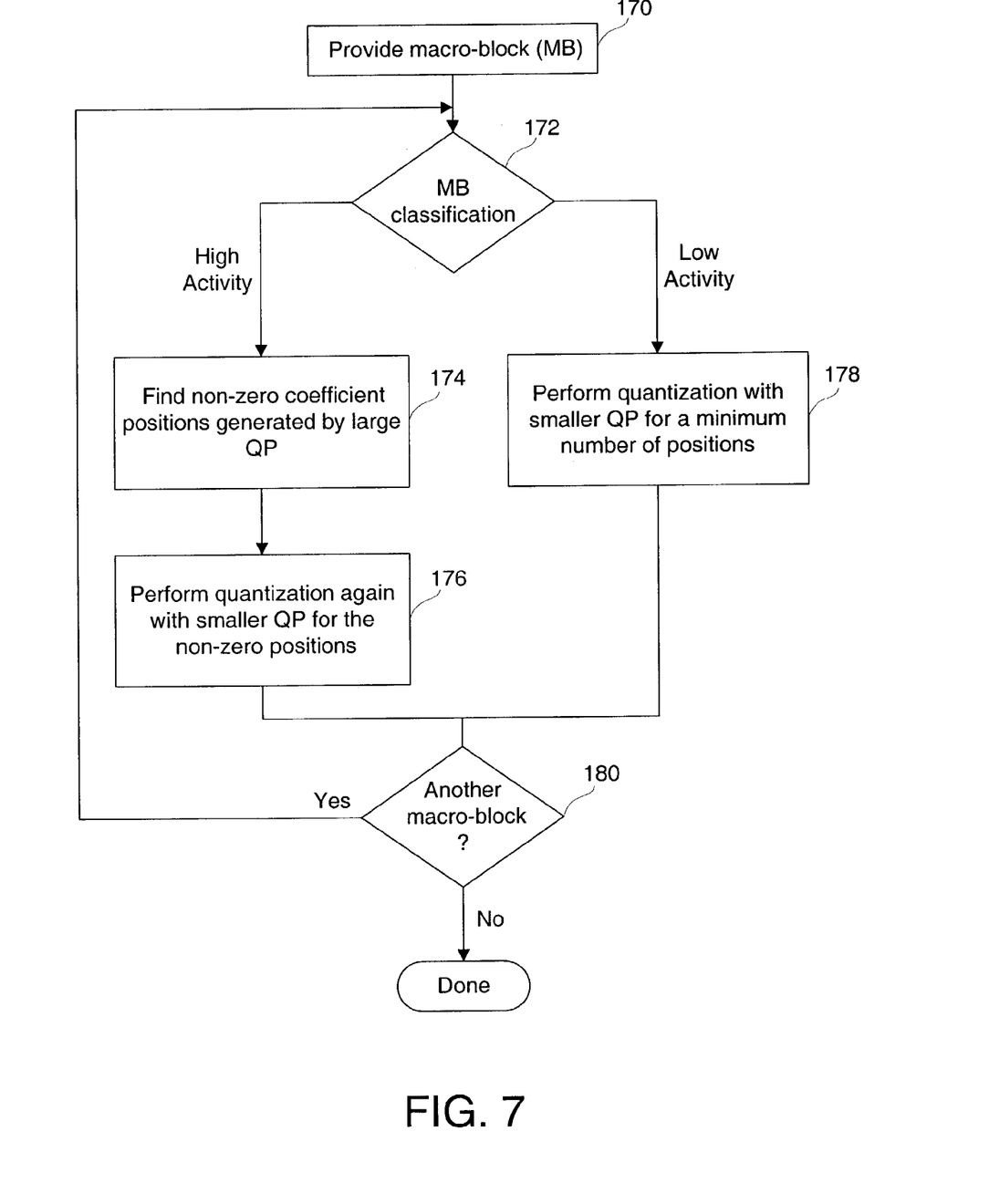
FIG. 7 is a flow chart diagram illustrating method operations for reducing a blocky artifact within an encoding loop of a block-based video compression scheme in accordance with one embodiment of the invention.

FIG. 7 is a flow chart diagram illustrating method operations for reducing a blocky artifact within an encoding loop of a block-based video compression scheme in accordance with one embodiment of the invention. The method initiates with operation 170 where a macro-block is provided. Of course, the macro-block can be associated with any block-based compression scheme, e.g., Motion Picture Expert Group (MPEG) 4. The method then advances to decision operation 172 where the macro-block is classified. Here, the macro-block is classified as either a high activity macro-block or a low activity macro-block. As discussed above, a high activity macro-block is associated with a non-uniform area, while a low activity macro-block is associated with a uniform or smooth surface. For example, a floor, wall or any region of uniform color may be considered a smooth surface, while non-uniform areas may include areas having color transitions, edges, etc. In one embodiment, a variance is calculated as described above, in order to determine whether the macro-block is classified as a high activity macro-block or a low activity macro-block. If the variance is greater than a threshold value then the macro-block is defined as a high activity macro-block. If the variance is less than a threshold value, then the macro-block is defined as a low activity macro-block. In one embodiment the variance is calculated in the spatial domain. If the macro-block is defined as a high activity macro-block, then the method proceeds to operation 174. In operation 174, a large QP is used to define positions for non-zero-coefficients. It should be appreciated that the large QP essentially defines a maximum number of non-zero coefficients associated with the compressed block of data. The method then moves to operation 176, where a quantization is performed again but this time with a smaller QP. However, the amount of non-zero coefficients generated in operation 176 is capped. The method then advances to operation 180 where it is determined if another macro-block exists.

Returning to operation 172 of FIG. 7, if the macro-block is classified as a low activity macro-block, then the method proceeds from operation 172 to operation 178. In operation 178, a quantization is performed with a smaller QP. The smaller QP is configured to define a minimum number of coefficients, i.e., limiting the positions having non-zero coefficients to minimize the amount of bits generated. In one embodiment, a value of the smaller QP used in operation 178 is the same as a value of the smaller QP used in operation 176 so that one QP value can be recorded in the macro-block header according to the compression standards. In another embodiment, the maximum number of positions having non-zero coefficients is limited to three. As mentioned above, the three positions include the DC coefficient, an AC coefficient configured to smooth a horizontal position and an AC coefficient for smoothing a vertical transition between bordering blocks. It will be apparent to one skilled in the art that more than three non-zero coefficients may be used, however, more bits will be generated. The method then moves to operation 180 where it is determined if another macro-block is to be processed. If another macro-block is to be processed, the method returns to decision operation 172 and repeats as described above. If there is not another macro-block to be processed, the method terminates.

Figure 8:
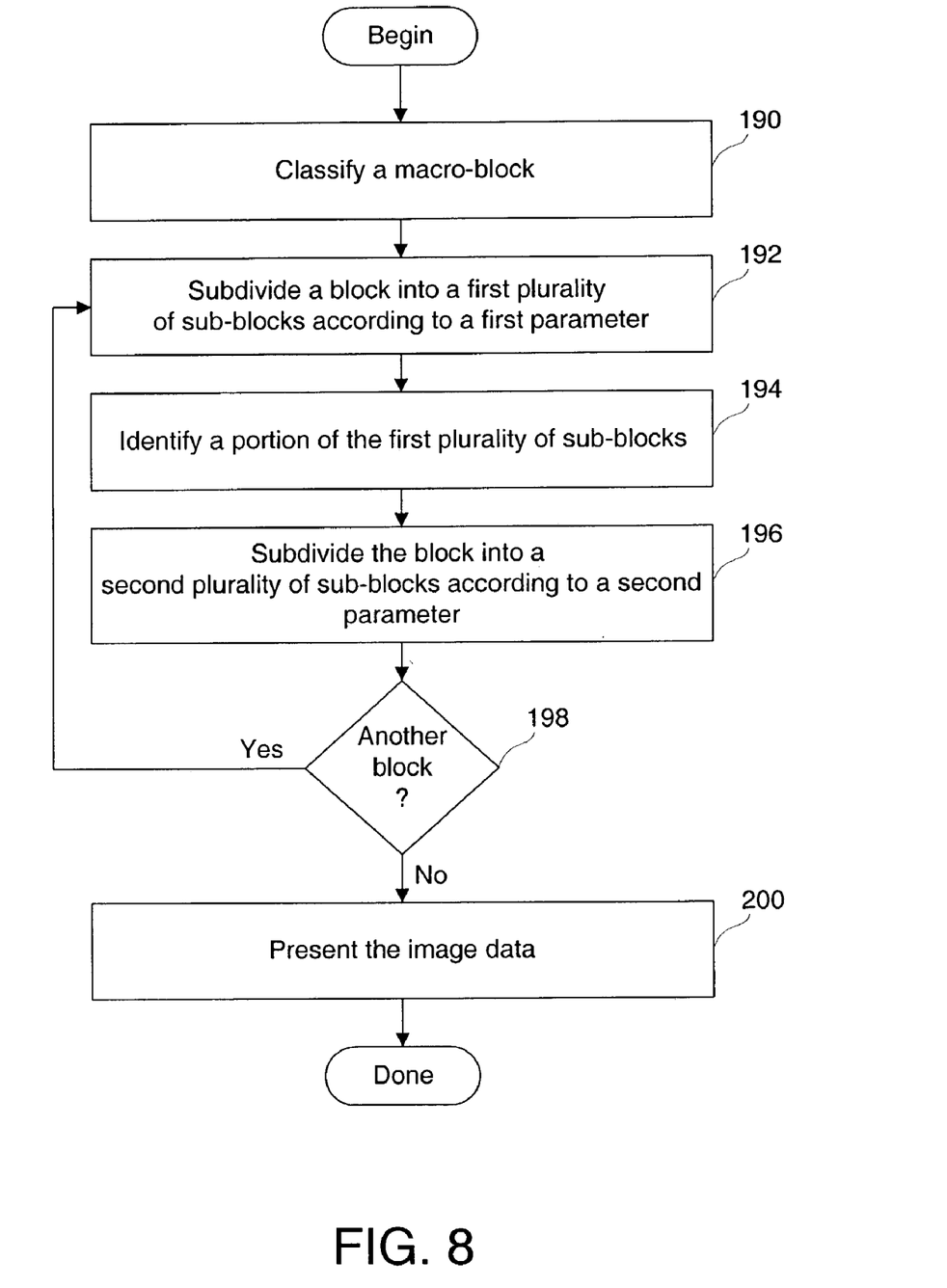
FIG. 8 is a flowchart diagram illustrating the method operations for processing a frame of image data during encoding to reduce power consumption during decoding in accordance with one embodiment of the invention.

FIG. 8 is a flowchart diagram illustrating the method operations for processing a frame of image data during encoding to reduce power consumption during decoding in accordance with one embodiment of the invention. The method initiates with operation 190 where a macro-block is classified. As described above, the macro-block may be classified as a low activity macro-block or a high activity macro-block. For example, the value of a variance associated with the macro-block may be compared to a pre-defined threshold value in order to determine the classification of the macro-block. In one embodiment of the invention, where the macro-block is a high activity macro-block, the method advances to operation 192 where an 8×8 block of the frame of image data associated with the high activity macro-block is subdivided into a plurality of sub-blocks according to a first parameter. For example, a quantization operation may be performed here where the first parameter is a quantization parameter. The method then proceeds to operation 194 where a portion of the plurality of sub-blocks is identified. Here, the identified portion corresponds to the sub-blocks associated with non-zero DCT coefficients resulting from the quantization operation.

The method of FIG. 8 then moves to operation 196, where a quantization operation is re-performed on the 8×8 block of the frame of image data associated with the high activity macro-block. The re-quantization is performed using a second quantization parameter where the second quantization parameter has a value that is smaller than the first quantization parameter. As mentioned above, the smaller quantization parameter results in higher quality video data for the reconstructed image. However, the amount of non-zero coefficients generated from the re-quantization is capped by the number of non-zero coefficients generated from the first quantization with the first parameter, i.e., the larger QP. Accordingly, the quantization parameter, also referred to as the quantization scale, and the amount of bits generated from the quantization operation are adjusted in order to provide an image having reduced blocky artifacts when reconstructed by the decoder. As such, post processing for the decoder is eliminated or substantially reduced.

The method of FIG. 8 then advances to decision operation 198 where it is determined if another block is to be processed. If another block is to be processed the method returns to operation 192 and repeats as described above. If there is not another block for processing then the method advances to operation 200 where the image data is presented. In one embodiment, the encoded image data is transmitted to a device having a decoder. The decoder then reconstructs the image data for presentation on a display screen. Since the image data has been encoded to minimize blocky artifacts, the decoder does not have to process the reconstructed image data for these artifacts introduced during compression. It should be appreciated that while FIG. 8 focuses on a macro-block classified as a high activity macro-block, low activity macro-blocks may also be processed as described with reference to FIG. 7. For example, the low activity macro-block is processed to yield non-zero coefficients at the lowest frequency positions in a compressed block at the encoding stage. In this embodiment, three non-zero coefficients result, where two of the three coefficients provide for a gradual vertical and a gradual horizontal transition, respectively, between adjacent blocks as described above.

Figure 9A:
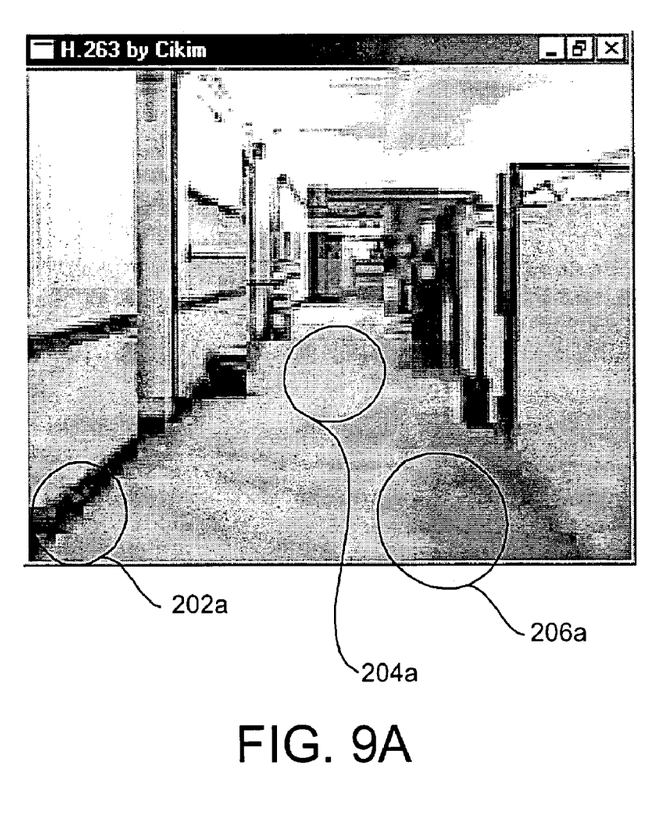
FIGS. 9A and 9B illustrate re-constructed images comparing the minimization of blocky artifacts through 1) pre-processing of the image data in the encoding loop as described herein and 2) no pre-processing of the data in the encoding loop, respectively, in accordance with one embodiment of the invention.
Figure 9B:
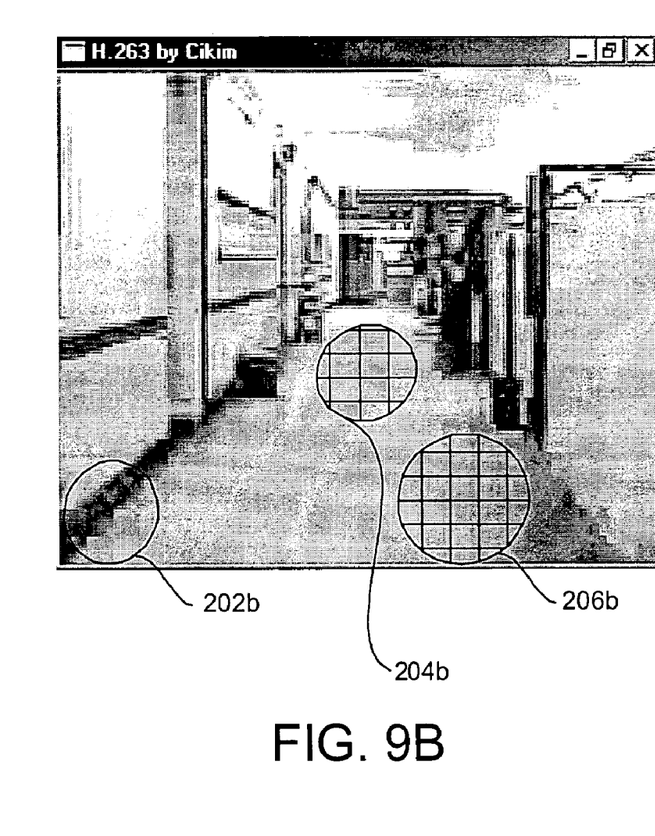

FIGS. 9A and 9B illustrate re-constructed images comparing the minimization of blocky artifacts through 1) pre-processing of the image data in the encoding loop as described herein and 2) no pre-processing of the data in the encoding loop, respectively, in accordance with one embodiment of the invention. FIG. 9A utilized a QP of 5 for the smooth areas, i.e., low activity areas, represented by region 204a and 206a. The QP of 5 resulted in non-zero coefficients at the lowest frequency being generated from the quantization as described above. A quantization parameter (QP) of 26 was used for the initial quantization of high activity areas, such as region 202a. The initial quantization resulted in a cap on the number of coefficients by defining a portion of sub-blocks as described above. Then, the re-quantization is performed with a QP of 5 to generate the coefficients for the portion of sub-blocks.

For FIG. 9B, a QP of 26 was used for the entire frame of image data. It should be appreciated that the respective low activity regions, 204a and 204b, 206a and 206b, show less blocky artifacts in FIG. 9A. The generation of non-zero coefficients at the lowest frequency results in the enhanced image quality for the reconstructed image in FIG. 9A. With respect to the high activity regions, 202a and 202b, the differences between blocky artifacts are not as noticeable since blocky artifacts on a smooth surface are much more noticeable to the human eye. However, the overall image quality is enhanced through the employment of the embodiments described herein.

Figure 10A:
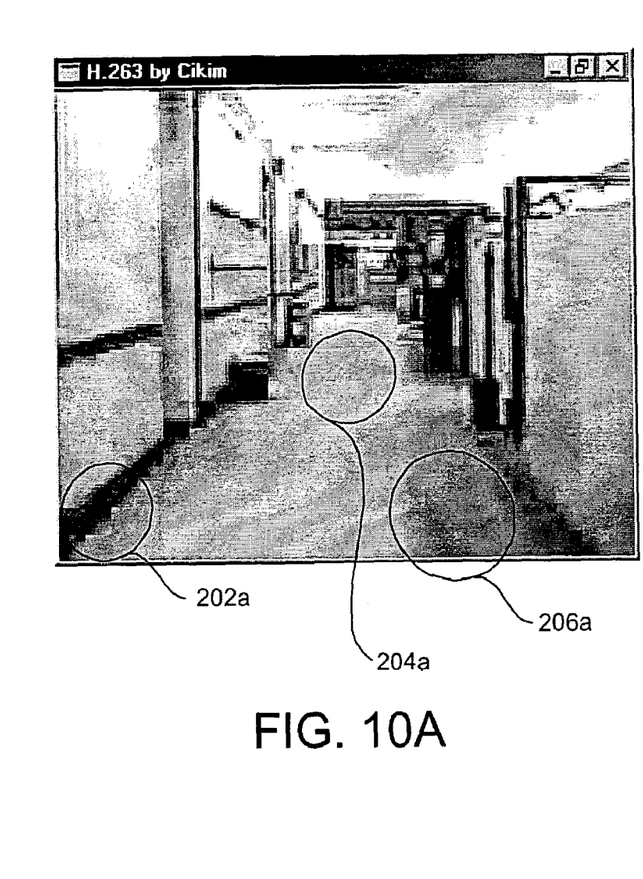
Figure 10B:
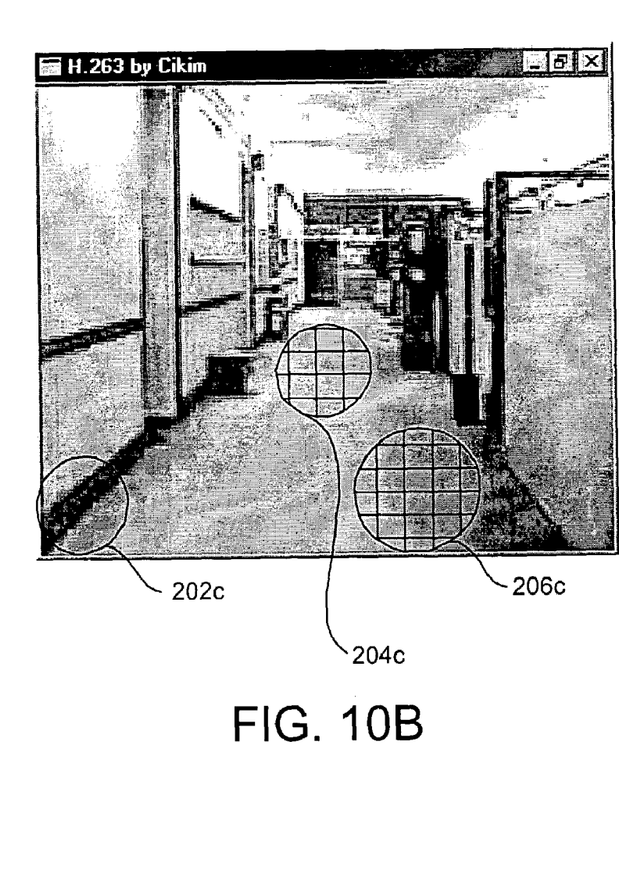

FIGS. 10A and 10B illustrate the images comparing the blocky artifacts generated when FIG. 9B is adjusted to provide substantially the same bit rate as FIG. 9A. Thus, the image of FIG. 9A and the image of FIG. 10A are identical. However, the image of FIG. 10B has been processed with a QP of 12 applied to the entire frame of image data. This QP provides a bit rate of approximately 24 kilobits per second, which is equivalent to the bit rate of FIGS. 9A and 9B. It should be appreciated that low activity regions of FIG. 10B, 204c and 206c, still result in noticeable blocky artifacts appearing. Furthermore, the image quality of high activity region 202a of FIG. 10A, as compared to region 202c of FIG. 10B, may be enhanced further by applying post-processing at the decoding stage. Even with the minimal post processing at the decoding stage, the power conservation is still significant due to the elimination of the post processing for the smooth areas as a result of the encoding stage processing.

In summary, the above described invention defines a method and system for minimizing blocky artifacts at the encoding stage in order to offload post-processing for these artifacts from the decoding stage. The elimination of the post processing from the decoding stage reduces power consumption and conserves the limited resources of handheld electronic devices into which the decoder is incorporated. The method and system described herein classify a macro-block of image data and process the macro-block according to the classification. For a high activity macro-block a first quantization parameter defines a limit for the positions of non-zero coefficients generated by a subsequent quantization with a second parameter configured to provide higher quality image data. For a low activity macro-block a maximum of three non-zero coefficients are generated from the quantization process, in one embodiment. It should be appreciated that the functionality described herein may be executed through circuitry having logic gates configured to perform the functionality. That is, the encoding and decoding functionality described above with reference to FIGS. 2–8 may be embodied on an integrated circuit chip. For example, a hardware description language (HDL) can be employed to synthesize the firmware and the layout of the logic gates for providing the necessary functionality described herein with reference to the functionality of the DCT domain filter. Accordingly, the integrated circuit chip may include circuitry for characterizing a macro-block and circuitry for adjusting a quantizer scale based upon the macro-block characterization.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for encoding video data to reduce blocking artifacts, comprising:
    identifying a macro-block as being associated with a blocking artifact; and
    mitigating the blocking artifact introduced through a compression operation by adjusting both a quantization parameter and an amount of bits generated from the quantization parameter, including applying an adjusted quantization parameter to a low activity compression block to limit a number of non-zero coefficients in the low activity block, and defining locations associated with non-zero coefficients of a high activity compression block according to the quantization parameter.

2. The method of claim 1 wherein, the method operation of identifying a macro-block as being associated with a blocking artifact includes,
    characterizing the macro-block as one of a high activity macro-block and a low activity macro-block according to a value of a variance associated with the macro-block.

3. The method of claim 1, wherein the method operation of mitigating the blocking artifact introduced through a compression operation by adjusting both a quantization parameter and an amount of bits generated from the quantization parameter includes,
    establishing a maximum number of non-zero coefficients generated from the quantization parameter applied to a low activity macro-block.

4. The method of claim 3, wherein the maximum number of non-zero coefficients generated is three non-zero coefficients.

5. The method of claim 3, wherein the maximum number of non-zero coefficients includes a first coefficient representing an average of image values associated with a compression block defined through the compression operation, a second coefficient configured to smooth a horizontal blocking artifact, and a third coefficient configured to smooth a vertical blocking artifact.

6. The method of claim 1, wherein the method operation of mitigating the blocking artifact introduced through a compression operation by adjusting both a quantization parameter and an amount of bits generated from the quantization parameter further includes,
    applying the adjusted quantization parameter to the defined locations of the high activity compression block.

7. The method of claim 1, wherein the compression operation is associated with a Motion Picture Expert Group (MPEG) compression standard.

8. A video encoder configured to provide image data needing minimal post-processing during decoding, comprising:
    circuitry for characterizing a macro-block of image data to be encoded as one of a high activity block and a low activity block; and
    circuitry for adjusting a quantizer scale based upon characterization of the macro-block, including circuitry configured to generate a limited number of non-zero coefficients associated with a compressed representation of the low activity block.

9. The video encoder of claim 8, wherein the high activity block corresponds to a region of image data having substantially non-uniform pixel values and the low activity block corresponds to a region of image data having substantially uniform pixel values.

10. The video encoder of claim 8, wherein the circuitry for characterizing a macro-block of image data to be encoded as one of a high activity block and a low activity block includes,
    circuitry for calculating a variance value associated with the macro-block; and
    circuitry for comparing the variance value to a threshold value to determine if the macro-block is one of the high activity block and the low activity block.

11. The video encoder of claim 8, wherein the circuitry for adjusting a quantizer scale based upon characterization of the macro-block includes, circuitry configured to limit non-zero coefficients to a portion of a compressed representation of a high activity block.

12. The video encoder of claim 8, wherein the video encoder is incorporated into an image capture device.

13. A system for processing image data associated with block based compression, comprising:
    an encoder configured to identify a type of block of image data for processing, the encoder configured to minimize a blocking artifact by adjusting both a quantization parameter and an amount of bits generated from the quantization parameter when encoding the block of image data, the encoder being configured to adjust the quantization parameter to limit non-zero coefficients to a portion of a compressed representation of a high activity block; and
    a decoder configured to receive the encoded block of image data transmitted from the encoder, the decoder configured to decode the encoded block of image data for presentation.

14. The system of claim 13, wherein the type of block of image data is one of a low activity block and a high activity block.

15. The system of claim 13, wherein the encoder is configured to adjust the quantization parameter to generate a maximum of three non-zero coefficients when encoding a low activity block of image data.

16. The system of claim 13, wherein the encoded block of image data is transmitted to the decoder over a network.

17. The system of claim 13, wherein the decoder is incorporated into a handheld electronic device having a display screen.

* * * * *